(12) United States Patent
Attarwala et al.

(10) Patent No.: US 9,580,530 B2
(45) Date of Patent: Feb. 28, 2017

(54) ANAEROBICALLY CURABLE COMPOSITIONS

(75) Inventors: Shabbir Attarwala, Simsbury, CT (US); Qinyan Zhu, Cheshire, CT (US); David P. Birkett, Naas (IE); Martin Wyer, Meath (IE); David Mullen, Meath (IE); Lee McGarry, Westmeath (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 13/435,985

(22) Filed: Mar. 30, 2012

(65) Prior Publication Data

US 2012/0231286 A1    Sep. 13, 2012

Related U.S. Application Data

(63) Continuation of application No. PCT/US2010/052616, filed on Oct. 14, 2010.

(60) Provisional application No. 61/251,968, filed on Oct. 15, 2009.

(51) Int. Cl.
| | |
|---|---|
| *C08F 20/12* | (2006.01) |
| *C08K 5/357* | (2006.01) |
| *C08F 222/10* | (2006.01) |
| *C09D 4/00* | (2006.01) |

(52) U.S. Cl.
CPC .......... *C08F 222/1006* (2013.01); *C09D 4/00* (2013.01); *C08K 5/357* (2013.01); *Y10T 428/31935* (2015.04)

(58) Field of Classification Search
CPC .................. C08F 222/1006; C08K 5/357
See application file for complete search history.

(56) References Cited

U.S. PATENT DOCUMENTS

| | | | |
|---|---|---|---|
| 3,218,305 A | | 11/1965 | Krieble |
| 3,988,299 A | * | 10/1976 | Malofsky ............... 526/259 |
| 4,180,640 A | * | 12/1979 | Melody et al. ......... 526/323.1 |
| 4,287,330 A | | 9/1981 | Rich |
| 4,321,349 A | | 3/1982 | Rich |
| 4,569,976 A | | 2/1986 | Zimmerman et al. |
| 4,607,091 A | | 8/1986 | Schreiber |
| 5,021,484 A | | 6/1991 | Schreiber et al. |
| 5,200,452 A | | 4/1993 | Schreiber |
| 5,445,911 A | | 8/1995 | Russell et al. |
| 5,605,999 A | | 2/1997 | Chu et al. |
| 5,811,473 A | | 9/1998 | Ramos et al. |
| 6,150,479 A | | 11/2000 | Klemarczyk et al. |
| 6,207,786 B1 | | 3/2001 | Ishida et al. |
| 6,342,545 B1 | | 1/2002 | Klemarczyk et al. |
| 6,620,905 B1 | * | 9/2003 | Musa .............................. 528/423 |
| 6,743,852 B2 | * | 6/2004 | Dershem .............. C07D 265/16 524/548 |
| 6,846,779 B1 | * | 1/2005 | Hinterwaldner ......... C09D 7/12 508/118 |
| 6,958,368 B1 | | 10/2005 | Klemarczyk et al. |
| 7,312,534 B2 | * | 12/2007 | delos Santos .............. C09J 5/06 257/783 |
| 2004/0123948 A1 | | 7/2004 | Dershem et al. |
| 2005/0239952 A1 | | 10/2005 | Attarwala et al. |
| 2007/0129509 A1 | | 6/2007 | Li et al. |
| 2007/0278683 A1 | | 12/2007 | Santos et al. |
| 2009/0022894 A1 | | 1/2009 | Attarwala et al. |
| 2010/0178501 A1 | | 7/2010 | Masuko et al. |

FOREIGN PATENT DOCUMENTS

WO    2007083810 A1    7/2007

OTHER PUBLICATIONS

International Search Report issued in connection with International Patent Application No. PCT/US2010/052616 mailed Jul. 28, 2011.
R.D. Rich, "Anaerobic Adhesives" in *Handbook of Adhesive Technology*, 29, 467-79, A. Pizzi and K.L. Mittal, eds., Marcel Dekker, Inc., New York (1994).
L.J. Baccei and B.M. Malofsky, "Anaerobic Adhesives Containing Maleimides Having Improved Thermal Resistance" in *Adhesive Chemicals*, 589-601, L-H, Lee, ed., Plenum Publishing Corp. (1984).
S. Rimdusit and H. Ishida, "Development of new class of electronic packaging materials based on ternary system of benzoxazine, epoxy, and phenolic resin," *Polymer*, 41, 7941-49 (2000).

* cited by examiner

*Primary Examiner* — Karuna P Reddy
(74) *Attorney, Agent, or Firm* — Steven C. Bauman

(57) ABSTRACT

The present invention relates to anaerobically curable compositions containing a benzoxazine component and which demonstrates resistance to elevated temperature conditions and/or accelerated cure speed.

11 Claims, 1 Drawing Sheet

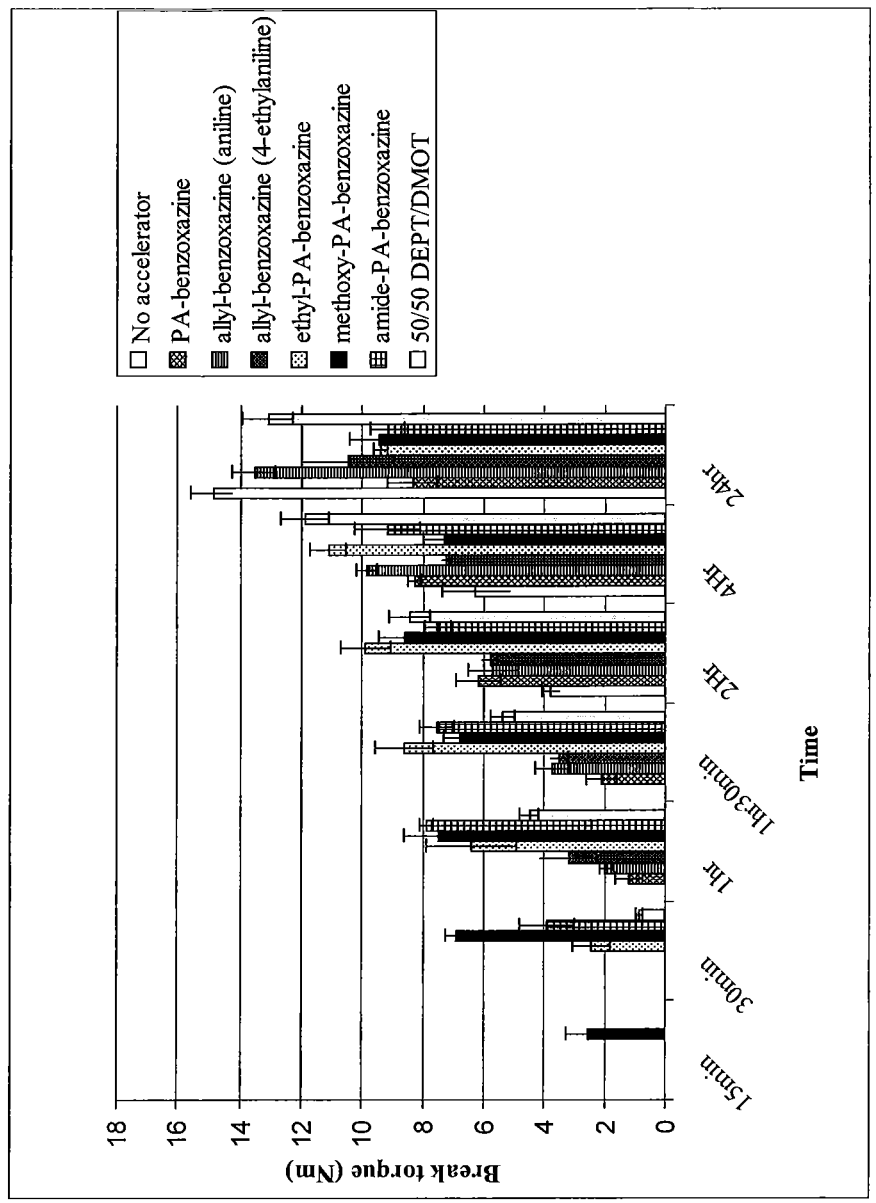

ANAEROBICALLY CURABLE COMPOSITIONS

BACKGROUND OF THE INVENTION

Field of the Invention

The present invention relates to anaerobically curable compositions containing a benzoxazine component and which demonstrates resistance to elevated temperature conditions and/or accelerated cure speed.

Brief Description of Related Technology

Anaerobic adhesive compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Many adhesives particularly anaerobic adhesives, have been rendered resistant to degradation at elevated temperatures by the inclusion of certain additives. For instance, U.S. Pat. No. 3,988,299 (Malofsky) refers to a heat curable composition having improved thermal properties, which includes certain acrylate monomers and maleimide compounds.

L.J. Baccei and B.M. Malofsky, "Anaerobic Adhesives Containing Maleimides Having Improved Thermal Resistance" in *Adhesive Chemicals*, 589-601, L-H, Lee, ed., Plenum Publishing Corp. (1984) report the use of maleimides—specifically, N-phenyl maleimide, m-phenylene dimaleimide and a reaction product of methylene dianiline and methylene dianiline bismaleimide—to increase the thermal resistance of anaerobic adhesives which are fully cured at temperatures of at least 150° C.

While the addition to anaerobic adhesive compositions of such maleimide compounds to render them resistant to thermal degradation provides reaction products with acceptable performance, it would be desirable to find alternative compounds to include in such formulations.

Henkel Corporation in the past designed certain anaerobic adhesive compositions with enhanced resistance to thermal degradation. For instance, U.S. Pat. No. 6,342,545 (Klemarczyk) discloses and claims a radical curable composition, radical cured reaction products of which demonstrate improved adhesion and resistance to thermal degradation at elevated temperatures. The composition, which may cure under anaerobic conditions, includes (a) a (meth)acrylate component; (b) an effective amount of latent imidizole as a thermal resistance conferring agent; and (c) a radical cure-inducing composition, such as an anaerobic cure-inducing composition. The latent imidazole is an adduct obtained by a reacting a compound having an active hydrogen together with a tertiary amino group, an epoxy compound and a carboxcylic acid anhydride. And the thermal resistance-conferring agent is selected from methyl imidizole, benzoyl imidizole, benzoyl methylimidizole, phthaloyl diimidizole and combinations thereof.

U.S. Pat. No. 6,150,479 (Klemarczyk) also discloses and claims a radical curable composition, radical cured reaction products of which demonstrate improved adhesion and resistance to thermal degradation at elevated temperatures. The composition, which may cure under anaerobic conditions, includes (a) a (meth)acrylate component; (b) a coreactant component of certain structures, examples of which include epoxidized citronellyl acrylate; epoxidized citronellyl methacrylate; cyclohexenyl methanol acrylate; cyclohexenyl methanol methacrylate; epoxidized cyclohexenyl methanol methacrylate; dihydrodicyclopentadienyl acrylate; epoxidized dihydrodicyclopentadienyl acrylate; dihydrodicylopentadienyl methacrylate; epoxidized dihydrodicylopentadienyl methacrylate; epoxidized 2-propenoic acid, 2-[(3a,3,4,5,6,7,7a-hexahydro-4,7-methano-1H-indenyl)oxy]ethyl ester; epoxidized 2-propenoic acid, 2-methyl-, 2-[(3a,3,4,5,6,7,7a-hexahydro-4,7-methano-1H-indenyl)oxy]ethyl ester and combinations thereof; and (c) a radical cure-inducing composition, such as an anaerobic cure-inducing composition. Here, the presence of the coreactant in the composition provides radical cured reaction products thereof with improved adhesion and resistance to thermal degradation. The compositions may also include a thermal resistance-conferring agent, such as one selected from imidizole derivatives (such as benzoyl imidizole, methyl imidizole, benzoyl methylimidizole, phthaloyl diimidizole and combinations thereof), latent imidizoles, and an adduct obtained by reacting a compound having an active hydrogen together with a tertiary amino group in the molecule, an epoxy compound and a carboxylic acid anhydride.

Benzoxazines themselves have been reported in the literature as generally having a high glass transition temperature, good electrical properties (e.g., dielectric constant), and low flammability.

Blends of epoxy resins and benzoxazines are known. See e.g. U.S. Pat. Nos. 4,607,091 (Schreiber), 5,021,484 (Schreiber), 5,200,452 (Schreiber), and 5,445,911 (Schreiber). And ternary blends of epoxy resins, benzoxazine and phenolic resins are also known. See U.S. Pat. No. 6,207,786 (Ishida), and S. Rimdusit and H. Ishida, "Development of new class of electronic packaging materials based on ternary system of benzoxazine, epoxy, and phenolic resin," Polymer, 41, 7941-49 (2000). See also U.S. Pat. No. 6,620,905 (Musa) and U.S. Patent Application Publication No. US 2004/0123948 (Dershem).

U.S. Pat. No. 4,569,976 (Zimmermann) indicates in the context of a reportedly improved redox cure system for acrylic adhesives at column 4, lines 44-54 that:

Fused ring structures, having the thiourea substituent suitably placed in the ring in a position beta to the ring heteroatom (also described as a 2-thiourea derivative), include benzofuran, benzothiofuran, isobenzoxazole, benzpyrazole, benzisoxazole, benzoxazole, 1,4-benzpyrone, quinoline, tetrahydroquinoline, isoquinoline, tetrahydroisoquinoline, cinnoline, quinazoline, naphthpyridine, benzoxazines, and the like. Preferred activators possessing the fused ring structure, include 2-quinolyl thiourea, 1-isoquinolyl thiourea, and 2-naphthyridyl thiourea.

Despite the state of the art, there is an on-going effort to improve the thermal performance of reaction products of radical-curable compositions, such as anaerobically curable ones, and to provide alternative technologies to improve the cure speed of such compositions.

SUMMARY OF THE INVENTION

The inventive anaerobically curable compositions include (a) a (meth)acrylate component; (b) an anaerobic cure-inducing composition; and (c) a benzoxazine component, such as one having no substitution at the 2 position relative to the benzoxazine nitrogen atom. That is, the carbon atom attached to the benzoxazine nitrogen atom desirably bears two hydrogen atoms.

This invention also provides methods of preparing and using the inventive anaerobic curable compositions as well as reaction products of the inventive anaerobic curable compositions.

The present invention will be more fully appreciated by a reading of the "Detailed Description of the Invention", and the illustrative examples which follow thereafter.

BRIEF DESCRIPTION OF THE DRAWING

FIG. 1 depicts a plot of strength development (measured in break torque) over time for the compositions described as Sample Nos. 1-8 in Table 1 and whose tabulated data is set forth in Table 2.

DETAILED DESCRIPTION OF THE INVENTION

The inventive anaerobically curable compositions include (a) a (meth)acrylate component; (b) an anaerobic cure-inducing composition; and (c) a benzoxazine component having no substitution at the 2 position relative to the benzoxazine nitrogen atom. That is, the carbon atom attached to the benzoxazine nitrogen atom each bears two hydrogen atoms.

The (meth)acrylate component may be chosen from a host of materials, such as those represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth) acrylates like polyethylene glycol di(meth)acrylates, tetrahydrofuran (meth)acrylates and di(meth)acrylates, hydroxypropyl (meth)acrylate ("HPMA"), hexanediol di(meth) acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 75 weight percent of the composition, such as about 50 to about 70 weight percent, based on the total weight of the composition.

The benzoxazine component may be included in the inventive compositions to serve to improve resistance to elevated temperature conditions and/or to accelerate cure speed. The benzoxazine component may be embraced by

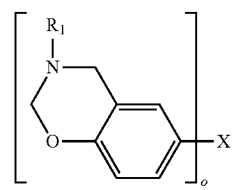

where o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), or sulfone (when o is 2), and $R_1$ is aryl, or

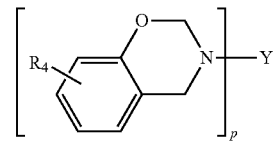

where p is 2, Y is selected from biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), or diphenyl ketone (when p is 2), and $R_4$ is selected from hydrogen, halogen, alkyl or alkenyl.

More specifically, the benzoxazine component is embraced by one or more of

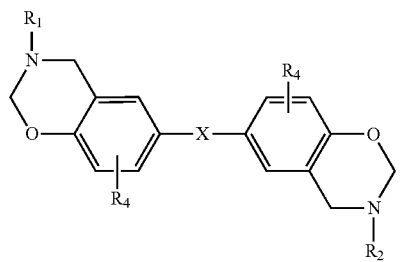

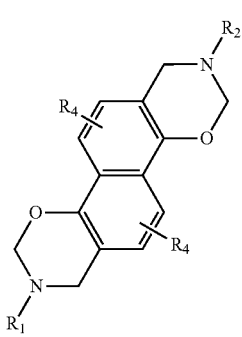

-continued

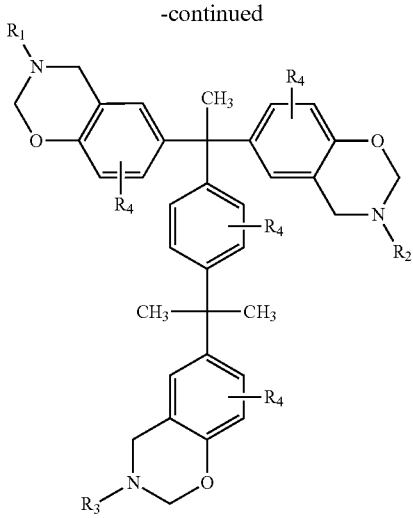

where X is selected from a direct bond, $CH_2$, $C(CH_3)_2$, $C=O$, $S$, $S=O$ or $O=S=O$, and $R_1$, $R_2$, and $R_3$ are the same or different aryl and $R_4$ is selected from hydrogen, alkyl, alkenyl or aryl.

Or, the benzoxazine is embraced by

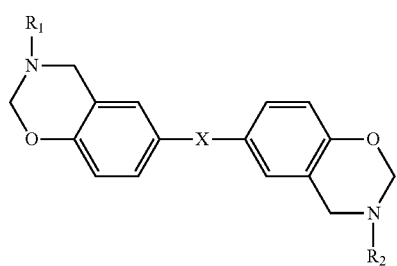

where X is selected from a direct bond, $CH_2$, $C(CH_3)_2$, $C=O$, $S=O$, $O=S=O$, or $S$, and $R_1$ and $R_2$ are the same or different and are selected from methyl, ethyl, propyls or butyls.

More specifically, the benzoxazine component is embraced by

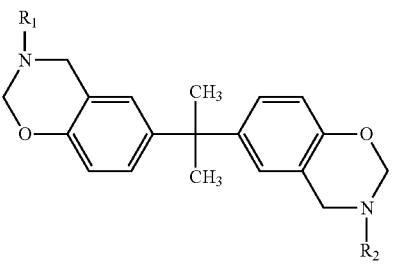

where $R_1$ and $R_2$ are the same or different and are selected from methyl, ethyl, propyls and butyls, though in a particularly desirable embodiment $R_1$ and $R_2$ are each aryl.

Particular examples of difunctional benzoxazines include

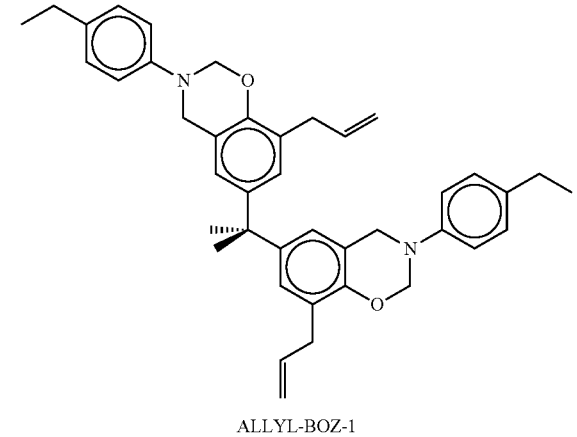

ALLYL-BOZ-1

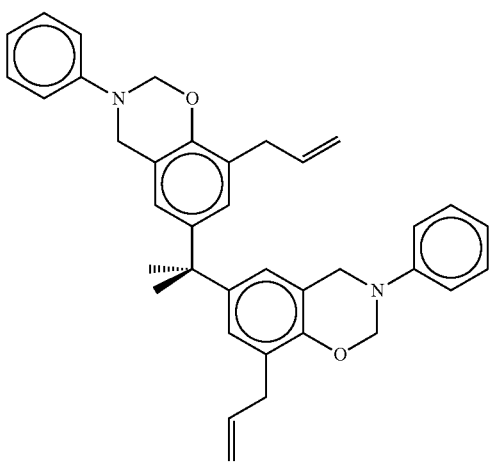

ALLYL-BOZ-2

The benzoxazine may also be a mono-functional benzoxazine. For instance, the mono-functional benzoxazine may be embraced by

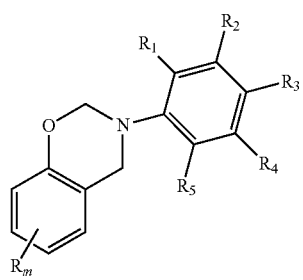

where R is selected from $C_{1-40}$ alkyl, $C_{2-40}$ alkenyl, each of which being optionally substituted or interrupted by one or more O, N, S, C=O, COO, and NHC=O, and $C_{6-20}$ aryl; m is 0-4, and $R_1$-$R_5$ are independently selected from $C_{1-40}$ alkyl, $C_{2-40}$ alkenyl, $C_{1-40}$ alkoxy, $C_{2-40}$ alkenoxy, each of which being optionally substituted or interrupted by one or more O, N, S, C=O, COOH, and NHC=O, and $C_{6-20}$ aryl, and at least one of $R_1$-$R_5$ are present.

Or, the mono-functional benzoxazine may be embraced by

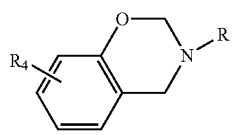

where R is alkyl, such as methyl, ethyl, propyls and butyls, or aryl with or without substitution on one, some or all of the available substitutable sites, and $R_4$ is selected from hydrogen, halogen, alkyl and alkenyl, such as where R is an aryl ring and $R_4$ is H.

Representative examples of the monofunctional benzoxazines described include

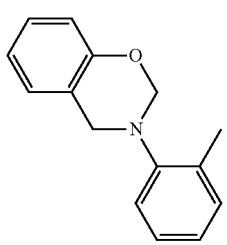
5

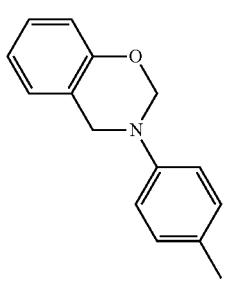
6

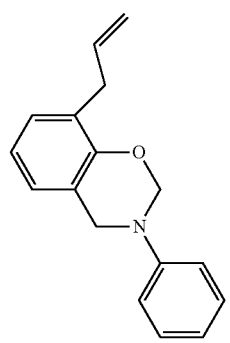
7

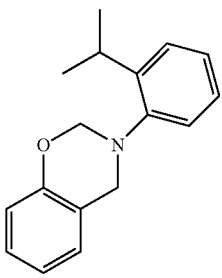
13

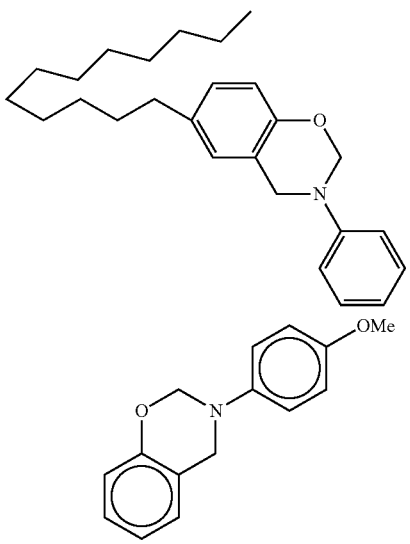
8

12

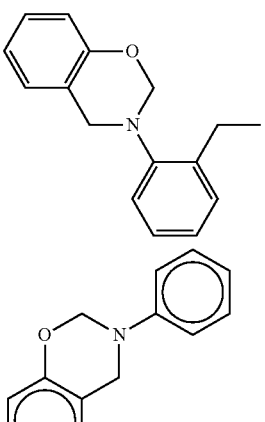
PA-BOZ

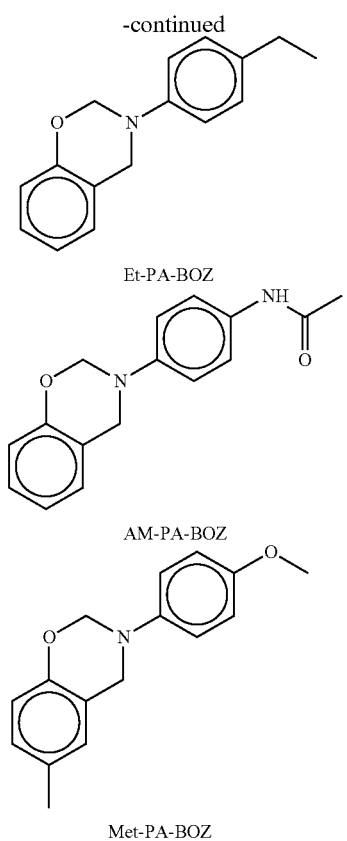

Et-PA-BOZ

AM-PA-BOZ

Met-PA-BOZ

Depending on the purpose for which the benzoxazine is included in the inventive compositions, the benzoxazine component comprise from about 0.01 to about 60 weight percent of the composition, such as about 0.10 to about 30 weight percent, based on the total weight of the composition. Where the benzoxazine is used to improve the resistance to elevated temperature conditions, the benzoxazine component should be used in an amount of 5 to 60 weight percent, such as about 10 to 15 weight percent; where the benzoxazine is used to accelerate the cure speed in conjunction with the anaerobic cure-inducing composition, the benzoxazine component should be used in an amount of 0.01 to 5 weight percent, such as about 0.01 to 2.5 weight percent.

Desirable anaerobic cure-inducing compositions (or, anaerobic cure systems) to induce and accelerate cure of the inventive compositions may include saccharin, maleic acid, and stabilizers like quinones, such as napthaquinone and anthraquinone. Conventionally, such anaerobic cure-inducing compositions would also include toluidines, such as N,N-diethyl-p-toluidine ("DE-p-T") and N,N-dimethyl-o-toluidine ("DM-o-T"), and acetyl phenylhydrazine ("APH"). Here, however, such materials are optional. See e.g. U.S. Pat. Nos. 3,218,305 (Krieble), 4,180,640 (Melody), 4,287,330 (Rich) and 4,321,349 (Rich). Here, the benzoxazine component may be used as a replacement for some or all of the toluidines.

The inventive compositions may also include other conventional components, such as metal catalysts, like iron and copper. Metal catalysts are generally undesirable in one-part anaerobic formulations (hence the use of sequestering agents to precipitate metals). In two-part anaerobic formulations, metal catalysts may be added to part of the formulation that does not contain an initiator, such as a peroxy compound.

A number of well-known initiators of free radical polymerization are typically incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

The anaerobic cure-inducing composition may be used in amounts of about 0.1 to about 10 weight percent, such as about 1 to about 5 weight percent, based on the total weight of the composition.

Additional components have been included in traditional anaerobic curable compositions to alter the physical properties of either the curable compositions or the reaction products thereof. For instance, thickeners, non-reactive plasticizers, fillers, toughening components (such as elastomers and rubbers, co-reactancts, such as maleimides), and other well-known additives may be incorporated therein where the art-skilled person believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The inventive compositions may have beneficial properties making them suitable for use in gasketing and composite applications. The compositions of this invention demonstrate particularly good bond strength on steel and aluminum. An appropriate primer may be applied to a surface of the chosen substrate to enhance the cure rate of the inventive compositions. See e.g. U.S. Pat. No. 5,811,473 (Ramos).

The invention also provides a process for preparing a reaction product from the anaerobic adhesive composition of the present invention, steps of which include applying the composition to a desired substrate surface and exposing the composition to an anaerobic environment for a time sufficient to cure the composition.

In view of the above description of the present invention, it is clear that a wide range of practical opportunities is provided. The following examples are provided for illustrative purposes only, and are not to be construed so as to limit in any way the teaching herein.

EXAMPLES

Synthesis Examples

Benzoxazines, such as the mono-functional benzoxazine referred to as PA-BOZ, may be prepared as follows:

Aniline (93 g, 1.0 mol), paraformaldehyde (60.0 g, 2.0 mol), phenol (94.0 g, 1.0 mol), and toluene (2000 ml) were placed into a 5000 ml three-neck round-bottom flask with a mechanical stir. A Dean Stark moisture-receiving trap together with a condenser were used to collect water generated from this reaction. This mixture was heated to reflux for a period of time of 4 hours while stirring was continued.

A total amount of 36 ml (2.0 mol) of water was collected. The reaction mixture was allowed to cool to room temperature and passed through a thin layer of silica gel. Then, solvent was removed by rotary evaporation and the residue liquid was sparged with nitrogen gas for a period of time of 4 hours. Et-PA-BOZ may be made by this procedure by swapping para-ethyl-aniline for aniline in equimolar amounts. AM-PA-BOZ may be made by this procedure by swapping N-acetyl-para-phenylene diamine for nailine in equimolar amounts. Met-PA-BOZ may be made by this procedure by swapping para-ethyl-aniline for aniline in equimolar amounts.

Diallylbisphenol-A benzoxazine may be prepared by adding with stirring 30.8 g (330.7 mmol) of aniline to 51.0 g (165.4 mmol) of 2,2'-diallylbisphenol A in a 500 ml beaker at room temperature. The stirring mixture was then placed in an ice-bath and cooled to below 5° C. Paraformaldehyde (19.9 g; 663.3 mmol) was added in portions over 20 minutes with stirring. The mixture was then allowed to rise to room temperature and stirred for 15 minutes. The temperature was then gradually raised to 80° C. and stirred for 1 hour. The temperature was then raised to 120° C. and stirred for 2 hours. The crude product mixture was then dissolved in chloroform and purified with three washes with 4N NaOH followed by several washes with deionised water. The chloroform was then removed by rotary evaporator to yield the desired product. The reported procedure is published in K. S. Santhosh Kumar et al., "Bis allyl benzoxazine: Synthesis, polymerisation and polymer properties", *Eur. Polym. J.*, 43, 2504-2514 (2007).

Formulation of Anaerobic Adhesives with BOZ Accelerator

Eight compositions were prepared, each of which included a (meth)acrylate component (comprising PEGMA), and other components as set forth below in Table 1 in percent by weight:

TABLE 1

| Components | | Sample Nos./Amt. (wt %) | | | | | | | |
|---|---|---|---|---|---|---|---|---|---|
| Type | Identity | 1 | 2 | 3 | 4 | 5 | 6 | 7 | 8 |
| (Meth)acrylate | PEGMA | 75.1 | 74.8 | 76.7 | 76.7 | 74.7 | 74.7 | 74.7 | 74.7 |
| Plasticizer | FLEXOL | 21.60 | 19.7 | 19.8 | 19.8 | 20.0 | 20.0 | 20.0 | 20.0 |
| Inventive Cure Accelerator | PA-BOZ | 0 | 0.25 | 0 | 0 | 0 | 0 | 0 | 0 |
| | ALLYL-BOZ 1 | 0 | 0 | 0.25 | 0 | 0 | 0 | 0 | 0 |
| | ALLYL-BOZ 2 | 0 | 0 | 0 | 0.25 | 0 | 0 | 0 | 0 |
| | Et-PA-BOZ | 0 | 0 | 0 | 0 | 0.25 | 0 | 0 | 0 |
| | Met-PA-BOZ | 0 | 0 | 0 | 0 | 0 | 0.25 | 0 | 0 |
| | AM-PA-BOZ | 0 | 0 | 0 | 0 | 0 | 0 | 0.25 | 0 |
| Conventional Cure Accelerator | 1:1 DE-p-T/DM-o-T | 0 | 0 | 0 | 0 | 0 | 0 | 0 | 0.25 |
| Anaerobic Cure Inducing Composition | CHP | 1.3 | 1.3 | 1.3 | 1.3 | 1.3 | 1.3 | 1.3 | 1.3 |
| | Saccharin | 1 | 1 | 1 | 1 | 1 | 1 | 1 | 1 |
| | Naphthaquinone | 0.1 | 0.1 | 0.1 | 0.1 | 0.1 | 0.1 | 0.1 | 0.1 |
| | Chelator | 1 | 1 | 1 | 1 | 1 | 1 | 1 | 1 |

Initially, the compositions were prepared by adding with mechanical mixing at room temperature the appropriate amounts of the components as noted.

The components were mixed for an appropriate period of time to allow for dissolution and/or dispersion, as the case may be, of the solid components. The so-formed formulations were stored for further use by covering the beaker ensuring that an air pocket remained between the surface of the formulation and the cover.

The formulations in accordance with this invention show shelf-stability at room temperature in open containers over time.

Application and Ambient Temperature Cure of Anaerobic Adhesives with BOZ Accelerator The sample formulations prepared as described above were applied in duplicate to five sets of degreased ⅜×16 mild steel nut and bolt assemblies, which were then allowed to cure at room temperature for a period of time of about 0.25, 0.5, 1, 1.5, 2, 4 and 24 hours. After the cure time, the fasteners were evaluated for break strength and prevail strength, data for which are shown below in Table 2 and in FIG. 1.

TABLE 2

| Time | Break/Prevail (N · m) on Degreased Steel Nuts/Bolts Sample No. | | | | | | | |
|---|---|---|---|---|---|---|---|---|
| (hours) | 1 | 2 | 3 | 4 | 5 | 6 | 7 | 8 |
| 0.25 | 0/0 | 0/0 | 0/0 | 0/0 | 0/0 | 2.5/1.1 | 0/0 | 0/0 |
| 0.5 | 0/0 | 0/0 | 0/0 | 0/0 | 2.4/0.9 | 6.9/4.2 | 3.9/0.8 | 0.8/0.2 |
| 1 | 0/0 | 1.2/0.3 | 2.0/0.5 | 3.2/0.7 | 6.4/1.4 | 7.5/5.0 | 7.8/3.1 | 4.5/1.0 |
| 1.5 | 0/0 | 2.1/0.7 | 3.7/0.9 | 3.5/0.9 | 8.6/2.1 | 6.8/4.0 | 7.5/3.5 | 5.4/1.3 |
| 2 | 3.8/0.9 | 6.2/2.4 | 5.7/1.8 | 5.8/1.7 | 9.9/3.5 | 8.6/6.3 | 7.5/3.8 | 8.4/3.2 |
| 4 | 6.3/2.5 | 8.3/4.3 | 9.8/3.5 | 7.2/3.0 | 11.1/3.9 | 7.3/4.7 | 9.2/3.6 | 11.9/5.5 |
| 24 | 14.9/9.0 | 8.3/4.5 | 13.5/3.8 | 10.5/3.8 | 9.4/4.1 | 9.5/5.4 | 9.2/4.2 | 13.1/6.4 |

These data indicate that the compositions in accordance with this invention (Sample Nos. 2-7) functioned at room temperature like traditional anaerobic (meth)acrylate-based adhesives when applied and cured on the substrates. Indeed, compared with Sample No. 1 which has no added accelerator and even in comparison with Sample No. 8, which has the combination of diethyl-p-toluidine and dimethyl-o-toluidine, the inventive compositions showed enhanced cure speed.

Formulation of Anaerobic Adhesives with BOZ Toughener

Initially, we evaluated LOCTITE 272 with and without a benzoxazine component at different levels to determine relative hot strength values.

LOCTITE 272 is made from an aromatic dimethacrylate ester (CAS No. 24448-20-2) in an amount between 60-100%, maleimide resin (CAS No. 3006-93-7) in an amount between 10-30%, hydroxyalkyl methacrylate (CAS No. 27813-02-1) in an amount between 1-5%, cumene hydroperoxide (CAS No. 80-15-9) in an amount between 1-5%, silica (amorphous, fumed, crystalline-free) (CAS No. 112945-52-5) in an amount between 1-5%, and APH(CAS No. 114-83-0) in an amount between 0.1-1%.

In Table 3 below, LOCTITE 272 was used as one control and is referred to as Sample No. 9. Sample Nos. 10-11 were formulated with LOCTITE 272 and the amount of benzoxazine shown.

TABLE 3

| Sample No. | Benzoxazine |
|---|---|
| 9 | 0 |
| 10 | 30 |
| 11 | 60 |

The benzoxazine component here is a 60/40 by weight blend of

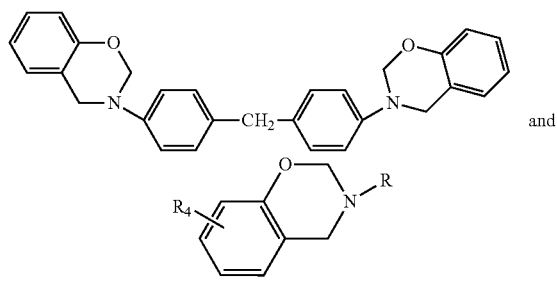

where R is an aryl ring and $R_4$ is H.

With reference to Table Nos. 4-6 below, it may be seen that upon application to steel nuts and bolts Sample No. 9 (without benzoxazine) demonstrated 10.7 N·m of breakaway strength after being allowed to cure for a period of time of 24 hours at room temperature and only 9.4 N·m breakaway hot strength after 24 hours at a temperature of 150° C. This reduction in hot strength translated into a retention of hot strength of 87%.

In contrast, Sample Nos. 10 and 11 (each with benzoxazine) demonstrated 11.0 and 8.7 N·m of breakaway strength, respectively, after being allowed to cure for a period of time of 24 hours at room temperature and 13.0 N·m and 19.4 N·m breakaway hot strength after 24 hours at a temperature of 150° C., respectively. This increase in hot strength translated into a retention of hot strength of 118% and 223%, respectively. Thus, in terms of retained strength, Sample No. 9 showed a decrease of 13% at 150° C. after the given time period whereas Sample Nos. 10 and 11 showed dramatic increases at 150° C. after the given time period, indicative of the positive impact the benzoxazine had on the samples.

TABLE 4

| Sample No. | Breakaway Strength, N · m After RTC 24 hrs | Breakaway Strength, N · m @ 150° C., 24 hrs | % Hot Strength Retained @ 150° C., 24 hrs (vs. 100% Initial Strength) |
|---|---|---|---|
| 9 | 10.7 | 9.4 | 87 |
| 10 | 11.0 | 13.0 | 118 |
| 11 | 8.7 | 19.4 | 223 |

TABLE 5

| Sample No. | Breakaway Strength, N · m After RTC 24 hrs | Breakaway Strength, N · m @ 200° C., 24 hrs | % Hot Strength Retained @ 200° C., 24 hrs (vs. 100% Initial Strength) |
|---|---|---|---|
| 9 | 10.7 | 8.1 | 76 |
| 10 | 11.0 | 12.2 | 111 |
| 11 | 8.7 | 16.5 | 190 |

TABLE 6

| Sample No. | Breakaway Strength, N · m After RTC 24 hrs | Breakaway Strength, N · m @ 233° C., 24 hrs | % Hot Strength Retained @ 233° C., 24 hrs (vs. 100% Initial Strength) |
|---|---|---|---|
| 9 | 10.7 | 7.5 | 69 |
| 10 | 11.0 | 9.7 | 89 |
| 11 | 8.7 | 14.0 | 161 |

What is claimed is:

1. An anaerobic curable composition, comprising:
(a) a (meth)acrylate component;
(b) an anaerobic cure system; and
(c) a benzoaxzine component,
wherein the benzoxazine component is embraced by

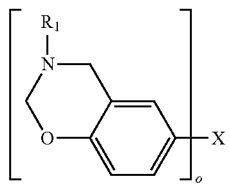

wherein o is 1-4, X is selected from the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), and $R_1$ is aryl, or

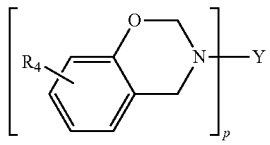

wherein p is 2, Y is selected from the group consisting of biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from the group consisting of hydrogen, halogen, alkyl and alkenyl.

2. An anaerobic curable composition comprising:
(a) a (meth)acrylate component;
(b) anaerobic cure system; and
(c) a benzoxazine component,
wherein the benzoxazine component is embraced by one or more of

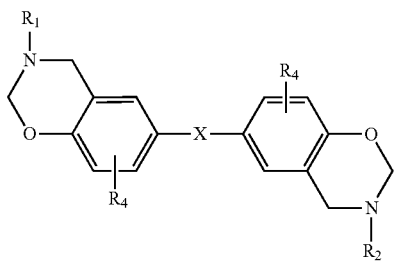

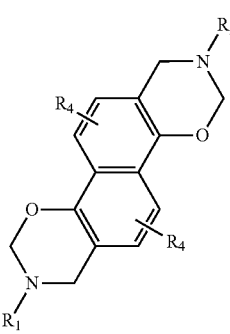

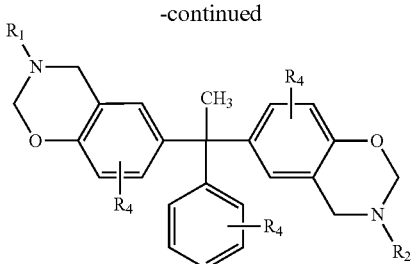

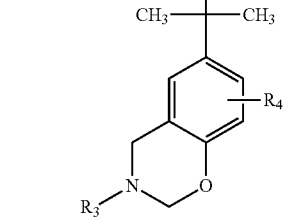

wherein X is selected from the group consisting of a direct bond, $CH_2$, $C(CH_3)_2$, C=O, S, S=O and O=S=O, and $R_1$, $R_2$, and $R_3$ are the same or different aryl and $R_4$ is selected from the group consisting of hydrogen, alkyl, alkenyl and aryl.

3. A anaerobic curable composition comprising:
(a) a (meth)acrylate component;
(b) an anaerobic cure system; and
(c) a benzoxazine component,
wherein the benzoxazine component is embraced by one or more of

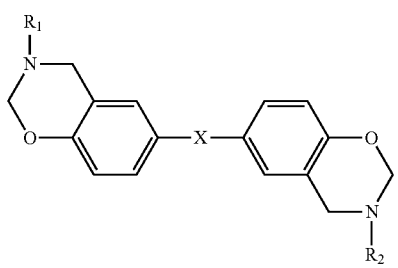

wherein X is selected from the group consisting of a direct bond, $CH_2$, $C(CH_3)_2$, C=O, S=O, O=S=O, and s, and $R_1$ and $R_2$, are the same or different aryl.

4. An anaerobic curable composition comprising:
(a) a (meth)acrylate component;
(b) an anaerobic cure system; and
(c) a benzoxazine component, wherein the benzoxazine component is embraced by

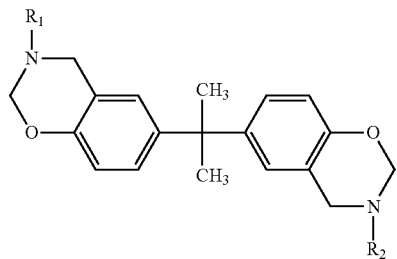

wherein $R_1$ and $R_2$ are the same or different aryl.

5. The composition according to claim 1, wherein the (meth)acrylate component is represented by $H_2C{=}CGCO_2R^1$, wherein G is a member selected from the group consisting of H, halogen and alkyl having from 1 to about four carbon atoms, and $R^1$ is a member selected from the group consisting of alkyl, cycloalkyl, aklenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

6. The composition according to claim 1, wherein the (meth)acrylate component is, selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth)acrylate, hexanediol di(meth)acrylate, and trimethylol propane tri(meth)acrylate.

7. The composition according to claim 1, wherein the benzoxazine component acts as a toughener.

8. The composition according to claim 1, wherein the benzoxazine component acts as an accelerator.

9. Reaction products of the composition according to claim 1.

10. A process for preparing a reaction product from an anaerobic curable composition, comprising the steps of:
apply an anaerobic curable composition according to claim 1, to a desired substrate surface and
exposing the composition to an anaerobic environment for a time sufficient to cure the composition.

11. A composition comprising a bond formed between two mated substrates with the composition of claim 1.

* * * * *

UNITED STATES PATENT AND TRADEMARK OFFICE
CERTIFICATE OF CORRECTION

PATENT NO. : 9,580,530 B2  
APPLICATION NO. : 13/435985  
DATED : February 28, 2017  
INVENTOR(S) : Attarwala et al.

Page 1 of 1

It is certified that error appears in the above-identified patent and that said Letters Patent is hereby corrected as shown below:

In the Specification

Column 1, Line 53: Change "imidizole" to -- imidazole --.

In the Claims

Column 16, Line 66: Change "s" to -- S --.

Signed and Sealed this
Twenty-fourth Day of July, 2018

Andrei Iancu
*Director of the United States Patent and Trademark Office*